April 2, 1957     S. J. BJÖRKMAN     2,787,764
PULSE-CODE MODULATION
Filed May 1, 1952                              9 Sheets-Sheet 1

Inventor:
Simon J. Björkman.

Fig. 3.

April 2, 1957  S. J. BJÖRKMAN  2,787,764
PULSE-CODE MODULATION

Filed May 1, 1952  9 Sheets-Sheet 3

Inventor.
Simon J. Björkman.

United States Patent Office 2,787,764
Patented Apr. 2, 1957

2,787,764
PULSE-CODE MODULATION

Simon J. Björkman, Stockholm, Sweden, assignor to Siemens & Halske Aktiengesellschaft, Munich and Berlin, Germany, a German corporation Application May 1, 1952, Serial No. 285,569

Claims priority, application Sweden May 10, 1951

8 Claims. (Cl. 332—11)

This invention relates to a method of and apparatus for coding electrical signals, and is particularly concerned with arrangements for producing signals which are variable as to time, for example, signals which constitute series of total values.

The invention may be used, for example, for electrical measuring instruments or as a modulator in the transmission of signals, or in totalizing or tabulating, when it is desired to transfer a continuously variable function to tabulated form or to translate a table from one totaling system to another.

In the case of measuring instruments, the arrangement according to the invention will give the results in the form of indications, as, for instance, by the deflection of a pointer. A code is produced which represents the symbol of a measured value. The code consists of a series of pulses which indicate the figures in a sum, and the time marks the power. Measuring is indicated on a scale having small divisions or steps. The scale area is divided into a number of elementary levels, and within this area the received sum indicates the number of the elementary level signals, thus approximating the measured value. Should the measuring be extended beyond the area and no other steps are taken, the number of figures in the sum is retained, but the figures are moved in power; that is, under certain constant conditions the same number of significant figures are obtained regardless of the value of the measured amplitude.

In the case of using the invention for modulation, the measuring speed may be made so high that the resulting summation series may represent the signals which convey, for instance, telephone conversations. As a matter of fact, the speed may be so increased that a number of simultaneous telephone conversations can be carried on in a multiplex system. Using in this manner an instrument according to the invention comes close to performing so-called pulse-code modulation.

Several different systems for such modulation have been proposed before. The invention differs from earlier known pulse-code modulators by an arrangement which performs the coding. Previously known modulators are tied to a definite area divided into small sections within which the signals must appear in order to be coded. According to the invention, there is no definite limit for the permissible signal amplitude. There is a certain physically represented area divided into elementary levels where the modulation is performed with accuracy corresponding to a given quantity. The signal may, however, be permitted to sweep around outside this quantitative area, and the coding takes place without the necessity of taking any special measures. It will be shown presently that the invention from this particular point of view can be considered a compromise between pulse-code and pulse-time modulation.

The simplest embodiments are obtained in practice when the summation symbols are to be expressed in the binary system. However, the invention is not limited to this form; devices and instruments may be provided for any desired system.

The various aspects, objects and features of the invention will be described presently with reference to the drawings, wherein.

A summary of the invention will first be given, followed by a detailed description thereof.

Summary

The codes are obtained by dividing and subtracting samples derived from an original signal. A sample pulse is by subtraction diminished to a value of which $p$ is an aliquot part, if $p$ denotes the base in the number system of the code, and then divided by $p$. The quotient obtained is treated in the same manner as the primary sample, that is, subtracted and divided. These operations are continued until zero is reached. The subtractions performed will constitute the figures of the code ordered in ascending digits. Thus, if $a_n$ denotes the figures, the code will be of the form:

$$a_n p^0 + a_n p^1 + a_n p^2 + \ldots + a_n p^m + a_n p^{m+1} + \ldots$$

A physical representation of the coding computations can be based upon the properties of exponentially decaying transients. Energy derived from the signal can be stored in the electric field of a capacitor as in Fig. 1a, or in the magnetic field of an induction coil as in Fig. 1b. This energy is dissipated in a resistor, whereby the voltage across or the current through it decreases exponentially with time. At certain predetermined instants (timing moments), separated by equal time intervals, the amplitude of this transient has decreased to a value equal to $1/p$ times the value at the preceding timing moment. The amplitude of the transient is at the timing moments measured on a scale having small division or steps. If the step number corresponding to the amplitude is not a number of which $p$ is an aliquot part, the amplitude is decreased by a proper subtraction. In the case of capacitor storage the subtractions are performed by a current generator $M_1$, and when the signal energy is stored in an inductive device the subtractor is a voltage generator $M_2$.

Figure 2:
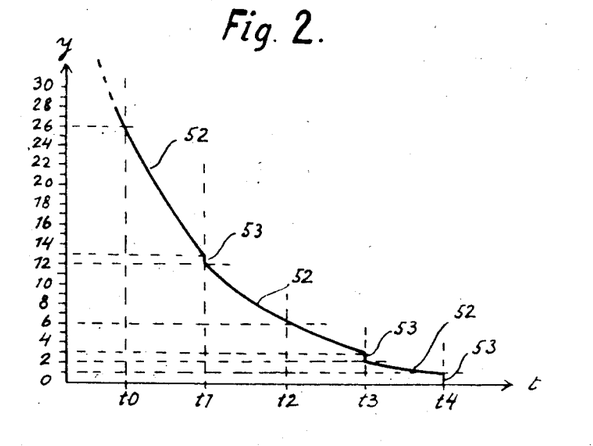
Fig. 2 is a graphic representation of binary coding.

Fig. 2 shows an example of binary coding. The amplitude of the transient along the y-axis is plotted against time. At the first timing moment $t_0$, the amplitude corresponds to 26 units, a number divisible by 2. At the following timing moment $t_1$, the amplitude is 13 units, and by a subtraction 53 it is diminished to 12, from which the discharge of the energy storage continues to 6 at $t_2$. Zero is reached by a subtraction at $t_4$, and the binary code of 26 will be $$0.2^0 + 1.2^1 + 0.2^2 + 1.2^3 + 1.2^4$$

or briefly, 0 1 0 1 1

Figure 3:
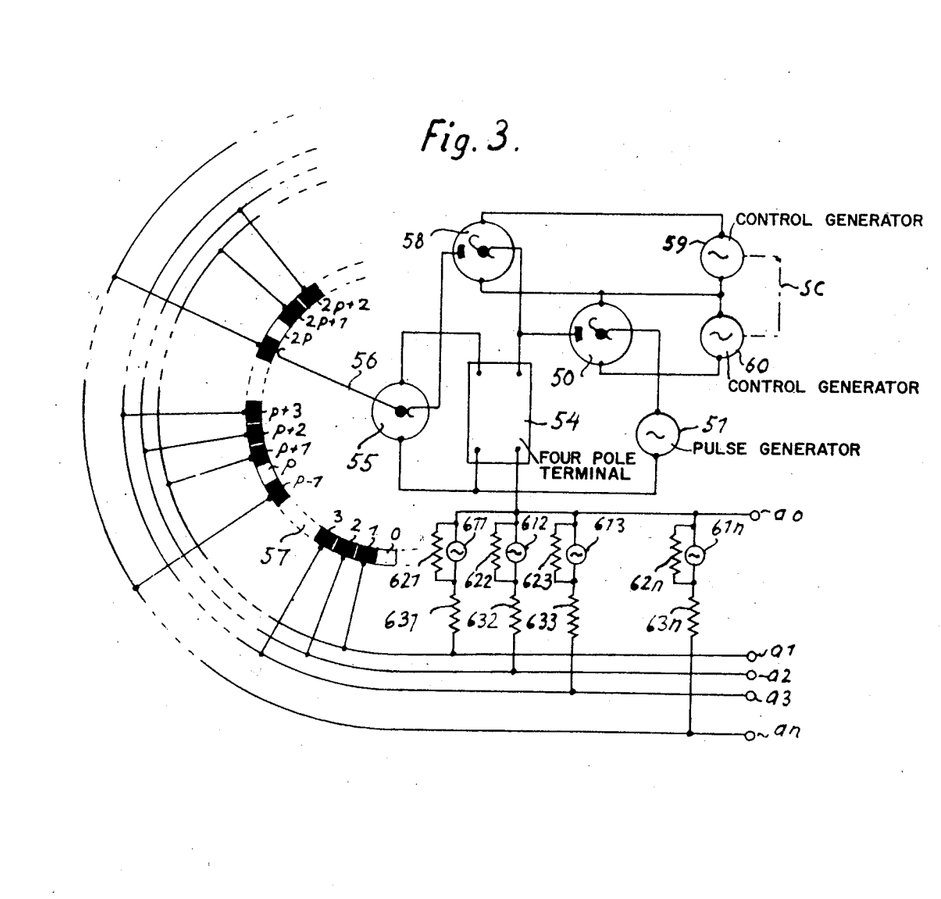
Fig. 3 is a diagrammatic representation of a coding device comprising a measuring scale as well as division and subtraction means.

Fig. 3 shows how coding can be performed automatically. Energy from the signal source 51 is transferred to a four-pole terminal 54 when the generator 60 momentarily actuates the relay 50. This energy will decay in a predetermined manner. The instantaneous value or the rate of change of the energy in the four-pole terminal is registered by a measuring instrument 55 which controls a pointer 56 moving over a scale 57. The scale comprises a number of small elements constituting $p$ classes. The order of the elements is as follows:

0, 1, 2, 3, ... $(p-1)$, $p$,
$(p+1)$, ... $(2p-1)$, $2p$, $(2p+1)$, ...

The elements 0, $p$, $2p$, $3p$, ... constitute a zero-class, 1, $(p+1)$, $(2p+1)$, ... being a class one; 2, $(p+2)$, $(2p+2)$, ... a class two; and so on. Except for the zero-class, the elements belonging to a class are connected together and joined to a subtraction generator, 611 for class one, 612 for class two and up to $61n$ for the last class.

When a coding operation is performed, the relay 58 operated by the generator 59 connects the four-pole terminal 54 to the pointer at the timing moments. If the corresponding scale element belongs to a class having a subtraction generator, this generator will immediately extract energy from the four-pole terminal. Due to this action the amplitude of the code transient drops, and the pointer is brought to the following scale element. If this is not a zero-class element, another subtraction generator will be connected to the energy storage comprising the four-pole terminal 54 and the same operation repeated. Ultimately a zero-class level is reached, and from this the following division is performed. The subtractions constituting the figures in the code may be obtained as pulses between the terminal $a_0$ and the terminals $a_1, a_2, \ldots a_n$.

The amplitude of the signal to be coded may exceed the amplitude range of the coding scale. Coding is always performed with an accuracy determined by the number of elements in the coding scale. If N is the number of steps and $m$ is the number of significant figures in the code, thus $$N = p^m$$

Figure 4:
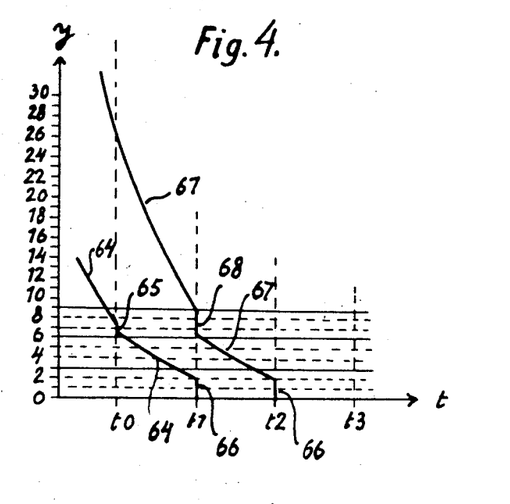
Fig. 4 shows in diagrammatic form two examples of ternary coding.

This number of figures is always preserved, a fact which is illustrated by Fig. 4.

Figure 4A:
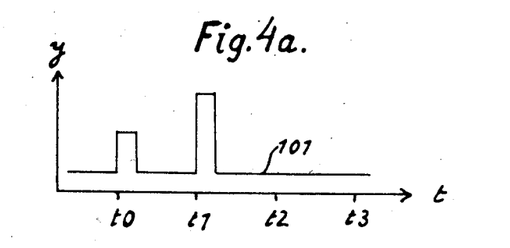
Fig. 4a shows a time diagram of a ternary pulse series received from a signal within the quantitative area of the amplitude scale.

In Fig. 4 a ternary coding scale consisting of nine levels is assumed. The number of significant figures will be two $(9=3^2)$. The zero-class is the levels 0, 3, 6 and 9. The curve 64 illustrates the coding of 7. At the timing moment $t_0$ a subtraction 65 down to the level 6 is performed. From 6 the transient decreases to $6/3=2$ at the time $t_1$, where a two-step subtraction down to zero occurs. The resulting code signal is shown in Fig. 4a, a short pulse "1" at $t_0$ and a larger "2" at $t_1$ symbolizing $$1.3^0 + 2.3^1$$

Figure 4B:
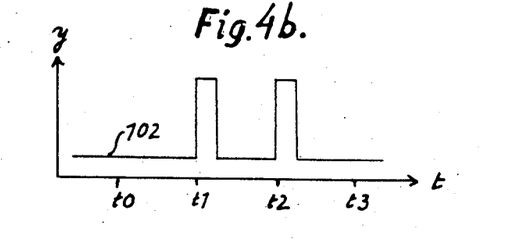
Fig. 4b indicates in similar manner as Fig. 4a a pulse-code received from a signal beyond the quantitative scale area.

The transient 67 shows the coding of 26. As at $t_0$ the amplitude of the signal exceeds the range of the code scale no subtraction can be made here. At $t_1$ the transient amplitude is 8⅔. Here a subtraction is made down to 6, and the coding then continues as in the preceding case. The code obtained is shown in Fig. 4b. The two pulses express $$2.3^1 + 2.3^2$$

Such big pulses are measured on a scale which is three times cruder than the small ones falling within the range of the coding scale. Arbitrarily large pulses can be coded, but with a finite number of figures, the smallest digits being successively omitted.

Coding apparatus based on the principles outlined above can be realized in a number of ways, among which electronic devices are important.

Figure 5:
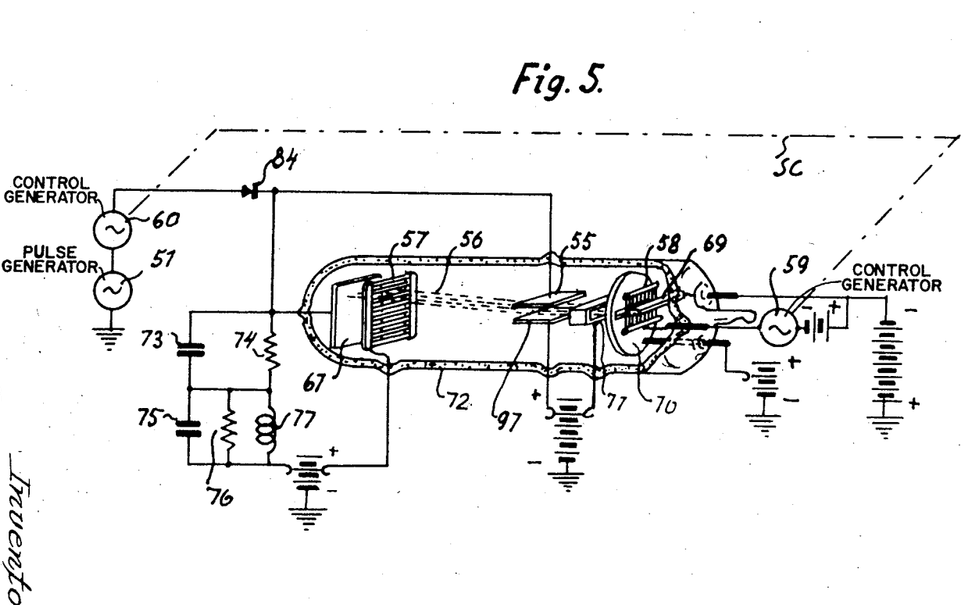
Fig. 5 illustrates an electronic coding device with elements of the code tube shown in perspective view, the ribbon-shaped electron beam being deflected over an electrode system.

Fig. 5 shows an example of an electronic code modulator. It is a binary modulator employing a special cathode ray tube. The coding tube is embodied in the general diagram of Fig. 3; a ribbon-shaped electron beam constituting the pointer 56 and its control means 55 being a deflection plate. A coding grid comprising parallel equidistant wires constitutes the scale 57 and a plate 61 the subtraction generator. The modulator operates in the binary system and only two classes of levels and only one subtraction generator are therefore needed. A grid cutting off the emission during the division intervals acts as the relay 58. Subtractions are made when the electron beam passes at timing moments between two code grid wires and reaches the plate 61.

The coding impedance network is composed of a parallel RC-circuit in series with a damped resonance circuit. The time constants of the two circuits are equal, and the period of the resonance circuit is equal to half of the time value of the RC-circuit. A code transient of the shape shown in Fig. 6 may in this manner be obtained. At the horizontal portions $\delta t_0$, $\delta t_1$, $\delta t_2$, ... the subtractions do not necessarily have to be short in time as is the case with purely exponential code transients.

Figure 7:
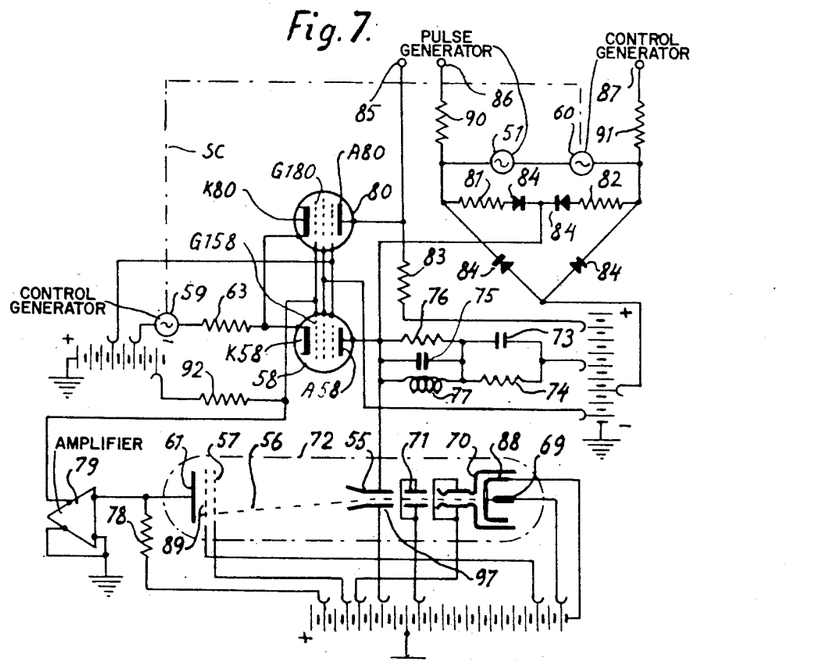
Fig. 7 shows in diagrammatic manner an electronic coding device similar to the one indicated in Fig. 5, but with certain changes and modifications.

The apparatus shown in Fig. 7 is similar to the one shown in Fig. 5, except that the relay 58 is a coincidence unit external to the coding tube. Means for coding both positive and negative pulses are also provided. The signals are fed to the coding impedance network through a two-way rectifier, and from one of the terminals 86 or 87 pulses denoting "plus" or "minus" may be obtained.

Figure 8:
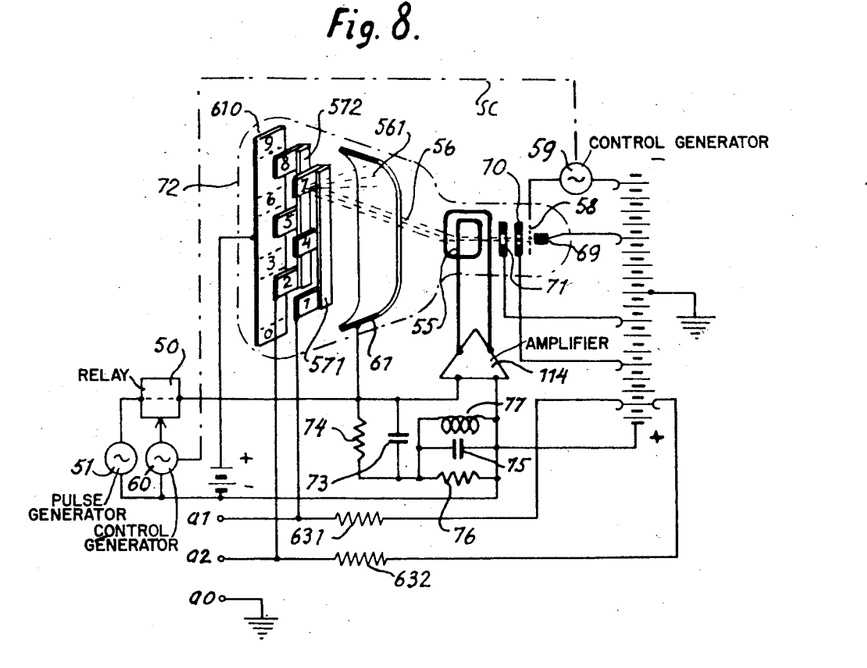
Fig. 8 indicates an electronic device for ternary coding employing a coding tube in which the electron beam is magnetically deflected to sweep over the code electrode system provided for the coding.

In Fig. 8 an example of ternary coding is shown. Two grids, 571 for the class "1" levels and 572 for the class "2," are prepared to give secondary emission when bombarded by electrons. When the beam 56, deflected by a coil 55, hits one of these grids, the secondary electrons released (561) are collected by an electrode 61. Current to this electrode discharges the coding impedance network, thus producing the subtractions required.

Figure 9:
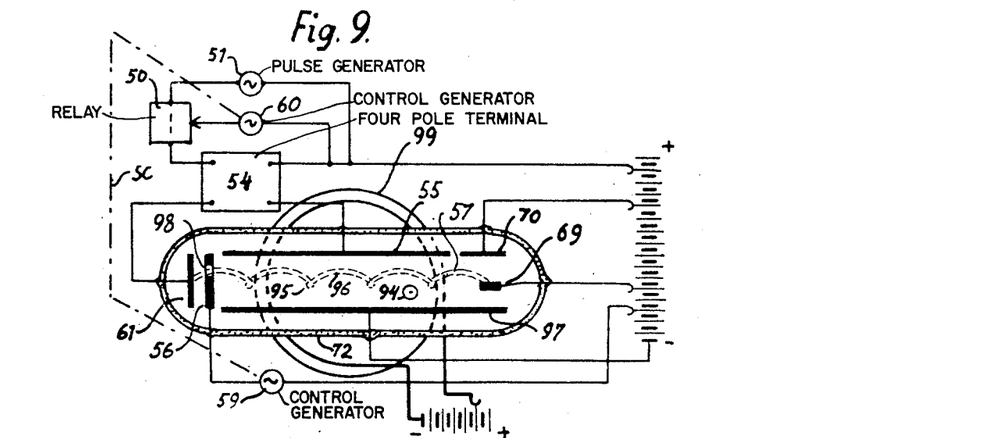
Fig. 9 illustrates a code tube with a trochoidal electron beam and means for coding associated therewith.
Figure 10:
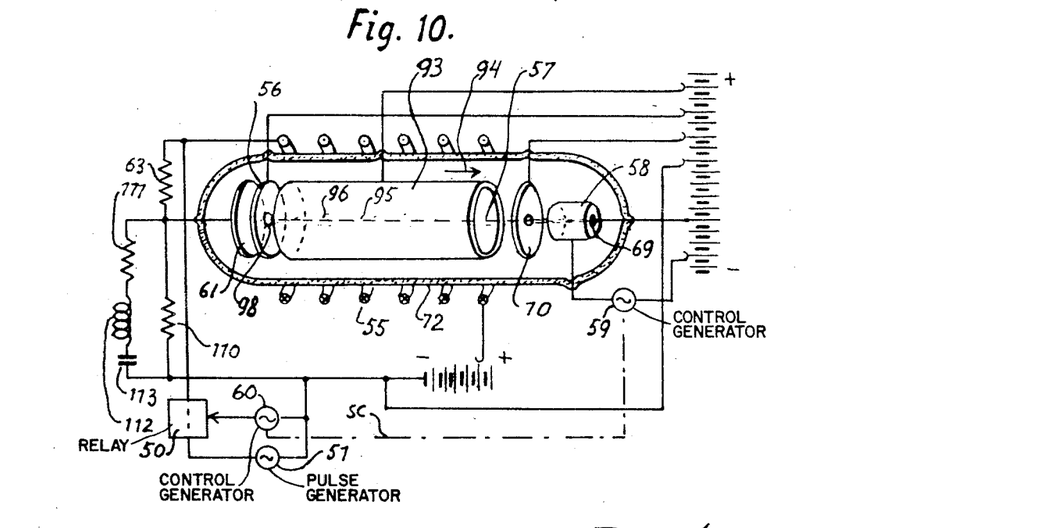
Fig. 10 shows incorporated in a coupling scheme a partly sectional perspective of a coding tube with a helical electron beam.

Figs. 9 and 10 are examples of coding tubes based on the behavior of electron beams subject to the action of both electric and magnetic fields. In Fig. 9 a trochoidal beam is produced in crossed electric and magnetic fields. When the potential of the plate 55 is varied, trochoid arcs (96) will at certain voltages pass through a slot 93. The voltages where this occurs form the "odd" voltage class required for binary coding. In Fig. 10 a series of foci (95) on a helical beam pass through a hole 98 when the magnetic field strength is varied.

Figure 11:
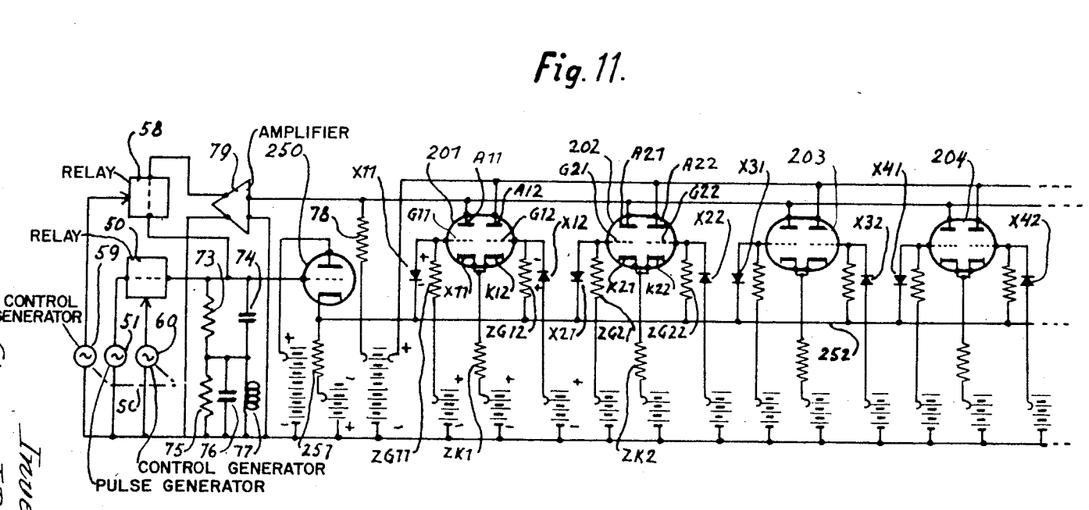
Fig. 11 is a coupling scheme for a coding apparatus with a chain relay series of double triodes and diodes.

Fig. 11 shows a coder employing a chain of double triodes 201, 202, 203, ... and rectifiers $X_{11}$, $X_{12}$, $X_{21}$, $X_{22}$, .... Current will flow to the paralleled anodes $A_{11}$, $A_{21}$, $A_{31}$, ... only in narrow ranges of the voltage at the terminal 252. These conduction ranges are near to the applied grid bias voltages of the double triodes. When, for example, the voltage at the terminal 252 is lowered below that of the biases of the grids $G_{11}$ and $G_{12}$, the voltage of the grid $G_{11}$ will follow the voltage of the terminal, whereas the voltage of the grid $G_{12}$ will remain constant. It follows therefore that the voltage of the cathodes of the tube is also constant, and the current to the anode $A_{11}$ will be cut off, due to low grid potential. When the voltage at the terminal 252 is increased, the grid $G_{11}$ will remain on its bias voltage and $G_{12}$ and the cathodes will follow up. The current to the anode $A_{11}$ is now cut off because of high cathode potential.

By properly adjusting the biases one may obtain, with the aid of one or more such chains, an operation according to the scheme of Fig. 3.

Figure 12:
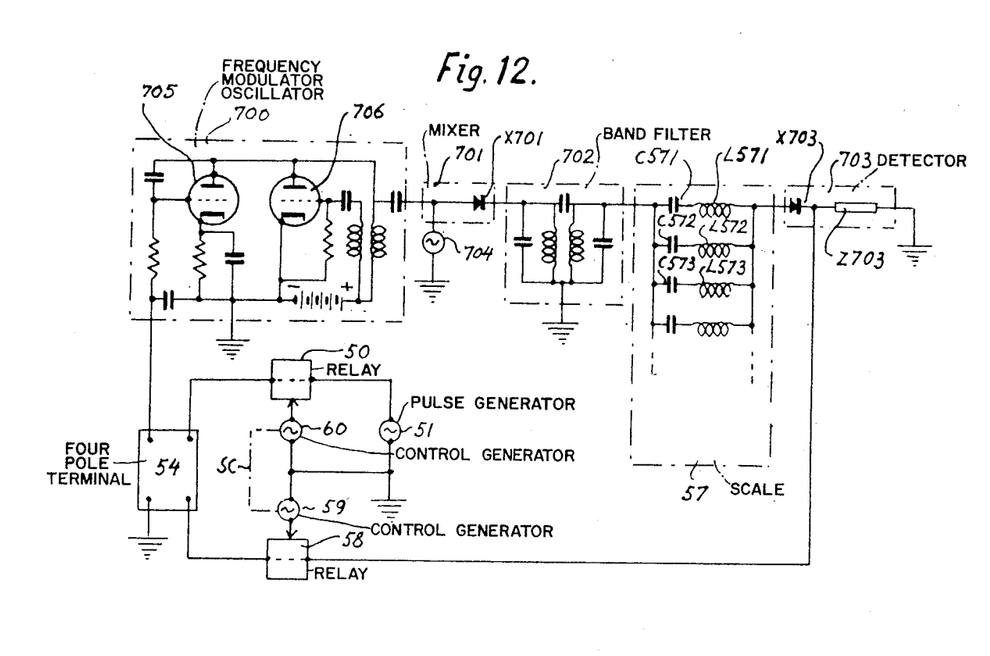
Fig. 12 shows a diagram of a coding device in which a sliding frequency is used to check the code signal.

Fig. 12 shows an apparatus where a variable frequency serves as the "pointer." The transient of the four-pole current storage terminal 54 controls a frequency modulated oscillator 700. The output of this oscillator is by means of an oscillator 704, a mixer 701 and a band-pass filter 702 transferred to a suitable frequency band. A number of filters constituting the scale 57 allows certain of the frequencies in this band to pass to a detecting device 703. The output of the detector is fed back to the four-pole terminal 54 over the gate 58.

*Detailed description*

As previously mentioned, the signal, at the time of the coding, is measured on a scale. The scale is subdivided into a number of small units or elementary levels which jointly cover a certain range of signal amplitude. A possible extreme case would be that the scale consists of only one unit. A scale covering a certain range to the zero point is referred to as "base scale." Several scales may be combined, both on the same end and on the opposite sides of the zero point.

In order to clarify the principle of the performance of the codes, it may be mentioned that the unit levels of the base scale are numbered with decade figures. Each level has its own physically necessitated number in the system in which the code operates, and the problem therefore arises to transmit a decade figure possibly to the own, but in most cases to another system. This can be done in the following manner: First, so many units are subtracted from the formal decade number that the balance can be evenly divided with the base in the codic summation system. From the quotient obtained after dividing the rest with the basic figure are subtracted as many units as are required to arrive again at the sum which is evenly divisible with the base. These operations are continued until the balance shows zero. The subtraction which have been made constitute the figures in the code summary or summation.

The following table shows an example of how the figure "21" is transposed into binary form:

| Subtraction | Division | Binary Power | Binary Figure |
|---|---|---|---|
| 21−1=20 | 20/2=10 | $2^0$ | 1 |
| 10−0=10 | 10/2= 5 | $2^1$ | 0 |
| 5−1= 4 | 4/2= 2 | $2^2$ | 1 |
| 2−0= 2 | 2/2= 1 | $2^3$ | 0 |
| 1−1= 0 | ------ | $2^4$ | 1 |

In this case the code is:

$1.2^0+0.2^1+1.2^2+0.2^3+1.2^4+0.2^5+0.2^6+\ldots$ or, condensed:

1 0 1 0 1 0 0 ...

Another example is the transposition of the figure "173" to the ternary system:

| Subtraction | Division | Ternary Power | Ternary Figure |
|---|---|---|---|
| 173−2=171 | 171/3=57 | $3^0$ | 2 |
| 57−0= 57 | 57/3=19 | $3^1$ | 0 |
| 19−1= 18 | 18/3= 6 | $3^2$ | 1 |
| 6−0= 6 | 6/3= 2 | $3^3$ | 0 |
| 2−2= 0 | ------ | $3^4$ | 2 |

The resulting code can be written in ascending digits from left to right:

2 0 1 0 2 0 0 ...

These mathematical operations, consisting of successive subtractions and divisions, can be produced or imitated physically. The signal or a sample of it is transposed into a quantity of potential energy which is disposed of in a damping device. An exponentially decreasing procedure is generally obtained in such manner. This can be purely aperiodical or else contain a periodical component. When the potential energy through some influence or some induction phenomenon is transposed into electromagnetism, the damping can be done with a suitable resistor. Under these conditions it will be found that at certain periods, and even intervals, the voltage across or the current through the damping resistor constitutes a constant fraction of the value at the corresponding previous moment, a condition that can be utilized when dividing in the code calculation. The subtractions can be arrived at with an intermittently working arrangement which starts functioning and removes or uses up proper amounts of energy at the above-mentioned moments.

Figure 1A:
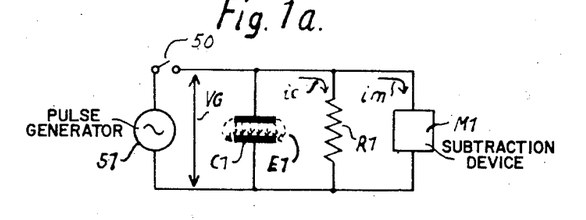
Figs. 1a and 1b show examples of elementary circuits which may be utilized in the coding.
Figure 1B:
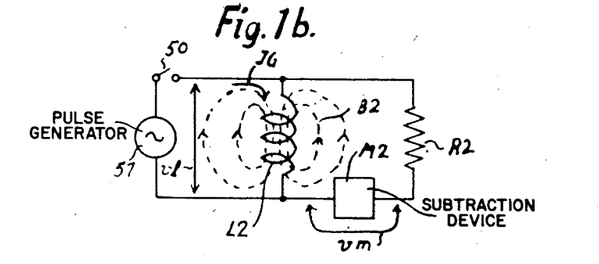

Figs. 1a and 1b are illustrations of basic schemes which may be employed in the coding. In Fig. 1a there is, upon closure of the switch 50, a voltage VG from a signal source 51 over the capacitor $C_1$. Energy is stored in the electrical field $E_1$ of the capacitor, which is proportional to the signal voltage. Upon opening of the switch 50, a discharge current $ic$ is induced in the resistor $R_1$, forming with the capacitor $C_1$ an RC-circuit.

Both the voltage and the current in the RC-circuit decrease exponentially gradually and we will obtain:

$$V(t) = v_0 e^{-tRC}$$

$V(t)$ refers to voltage as function of time, $t$ is time, $v_0$ the voltage across $C_1$ at $t=o$, and $e$ is the base in the natural logarithm system. R and C mean resistance and capacitance for the resistance $R_1$ and the capacitor $C_1$, respectively.

The equation may be converted to:

$$t_2 - t_1 = RC . \log_e v_1/v_2$$

where $v_1$ and $v_2$ are momentary values of the capacitor voltage at two different moments $t_1$ and $t_2$.

It will be seen that, starting from an arbitrarily chosen point of time $t=o$, the time scale can be split for discharges in even intervals at the beginning and end of which:

$$v_1/v_2 = p$$

where $p$ is the base in the code summary system.

On the foregoing observations is based the carrying out of the divisions at the coding, and the moments during which the action occurs will be referred to as marking periods. The subtractions, which may be required during marking periods, are done with a subtraction device which in Fig. 1a is indicated at $M_1$. It is in principle a current generator which is adapted to create discontinuities during discharge through elimination of charging with a subtraction current $im$ from the capacitor.

When the switch 50 shown in Fig. 1b is closed, a current IG is being impressed from the signal generator 51 through an induction coil $L_2$. Energy corresponding to this current IG is transferred in the magnetic field $B_2$. When the contact 50 is opened, an electromotive force $v_1$ is induced in the coil $L_2$. In the RL-circuit formed by the coil $L_2$ and the resistor $R_2$ now flows a current which is proportional to the voltage and which diminishes exponentially in accordance with the expression:

$$I(t) = i_0 e^{-t \cdot R/L}$$

where $I(t)$ is the discharge current as a time function, and $i_0$ is the current in the RL-circuit at the time period $t=0$. The letter R denotes the resistance in the resistor $R_2$, L the inductance in coil $L_2$, and $e$ is, as before, the base in the natural logarithm system. Analogous to the previously discussed example, one can write:

$$t_2 - t_1 = L/R \cdot \log_e i_1/i_2$$

where $i_1$ and $i_2$ is the discharge current at the time periods $t_1$ and $t_2$. One arrives, even here, at marking periods at which $$i_1/i_2 = p$$

The subtraction device $M_2$ in Fig. 1$b$ is principally a voltage generator which produces the required discontinuities during the discharging through subtracting the voltage $vm$ from the electromotive force flowing over $L_2$.

Energy from the signal does not always have to be stored in electrical or magnetic fields as in these sample examples. Other forms of energy storing may be considered, including potential mechanical energy.

Fig. 2 is a time diagram showing a discharge course when a signal is transferred into a binary code according to the above noted method. Along the time axis $t$ are indicated the marking periods $t_0$, $t_1$, $t_2$, etc., $t_0$ being the zero point from which the marking periods are calculated. The Y-axis can be considered as representing either the voltage across or the current through a damping resistor. The curve 52 indicates the exponentially decreasing time function and, as binary coding is involved in this example, the timing moment amplitude in a marking period is half the value of a corresponding previous moment. The time interval $t$ between two marking periods has been selected so that, in the case of an RC-circuit:

$$\Delta t = RC \cdot \log_e 2$$

For an RL-circuit the corresponding expression is:

$$\Delta t = L/R \cdot \log_e 2$$

The ordinate has been divided into units or levels numbered with decade figures. The amplitude for curve 52 is 26 units at $t_0$. The code obtained must thus be an expression of the figure "26" in binary form. At $t_1$ the amplitude has decreased to 13 units. Here the subtraction device starts functioning and places the amplitude to the level 12 which is evenly divisible by 2, resulting in a discontinuity 53. Over the level 6 at $t_2$ the discharge 52 continues to the level 3 at $t_3$, when another discontinuous descent 53 is caused by the subtraction device so that the next marking section of the discharge 52 begins at the level 2. Finally, at $t_4$ the amplitude goes down to zero with another descent 53 from level 1.

These discontinuities 53 caused by the subtraction device are divided in time-current or voltage-pulses representing in the two-cipher system the figure "1." The binary code-pulse series is obtained from the figure "26," thus:

$$t_0 = 0, \ t_1 = 1, \ t_2 = 0, \ t_3 = 1, \ t_4 = 1, \ \ldots$$

The time period indicates the digits so that $t_0$ corresponds to $2^0$, $t_1$ indicates $2^1$, etc., and the code can therefore be written as:

$$1 \cdot 2^0 + 1 \cdot 2^1 + 0 \cdot 2^2 + 1 \cdot 2^3 + 1 \cdot 2^4 + \ldots, \text{ or}$$

$$0 \ 1 \ 0 \ 1 \ 1 \ldots$$

This coding example has been described in connection with an aperiodical course (transient), but the same result can be obtained by utilizing a damped oscillation or with an exponential course superimposed on a damped oscillation.

Fig. 3 shows how coding can be carried out automatically. A four-terminal device 54 contains such elements and arrangements as are necessary for duplicating the coding divisions. It can thus absorb an amount of energy which is proportionate to the signal from the source 51 at the time when the relay 50 is actuated under the control of the generator 60. When the relay 50 is opened again, this energy disappears in a gradual exponentially decaying discharge course. The discharge current or voltage is measured by an instrument 55 which controls a pointer or contact arm 56.

The pointer 56 moves over a scale 57 consisting of elementary levels numbered with decade figures. The levels are joined into groups, each group corresponding to a figure in the summary system of the code. If, as previously, $p$ denotes the base of the system, a group corresponding to "0" is arrived at:

$$0; \ p; \ 2p; \ 3p; \ \ldots$$

another group corresponding to "1":

$$1; \ p+1; \ 2p+1; \ 3p+1; \ \ldots$$

and so forth, to a total of $p$-groups. The number of levels in each group depends on how many significant figures the code will contain. In order to fully utilize the dissolving power for the signal, which a certain number, say $m$ significant figures offer, the total number of levels in the scale, if the zero level is not included, will be:

$$N_{max} = p^m - 1$$

The number of levels on a scale can naturally be selected arbitrarily or with consideration of other factors than the greatest dissolving power indicated here. The above number, $N_{max}$, indicates only the maximum number of elementary levels a scale can contain when a summary system and the number of significant figures are given. All the level groups except the one with $p$ evenly divisible, that is, the one for the figure "0," are connected with subtraction devices in the form of a series of generators 611, 612, 613 . . . shunted by the impedances 621, 622, 623 . . . and connected in series with the impedances 631, 632, 633 . . . . The relay 58 governed by the generator 59 is closed during the marking periods, and the contact arm 56 connects with a subtraction device which draws energy from the four-pole terminal device 54. The discharge current or voltage which actuates the device 55 is thus decreased, and the contact arm consequently moves to a lower level where another subtraction device is reached and another subtraction begins.

The operation continues until the contact arm 56 reaches a level which is evenly divisible by $p$ when no subtraction device is reached. Provided the subtractions are sufficiently speedy, the contact arm, and therewith also the discharge course at every marking period, is moved to a level which is evenly divisible with the base. The figures of the code resulting from these subtractions can be obtained, for example, as current or voltage pulses between the terminal $a_0$ and the terminals $a_1, a_2 \ldots a_n$.

The dotted line SC connecting the generators 59 and 60 indicates that the generators are synchronized with a certain frequency and a certain phase angle relative to one another.

The curves in the diagram, Fig. 4, show examples of automatic ternary coding. The ordinate in the diagram gives the amplitude of the oscillating discharge and has been divided into units numbered with decade figures. A code signal is provided on the nine first unit levels counted from the zero level. The levels which are evenly divisible with the base, in this case the figure "3," are marked by continuous horizontal lines; the others for the elementary levels are indicated in dotted lines. The latter levels are divided into two figure groups, one for the figure "1" and the other for the figure "2." Each of these groups is connected with a subtraction generator.

Along the abscissa or $t$-axis are indicated the marking periods $t_0$, $t_1$, $t_2$, etc. The marking periods indicate in the code the ternary digits $3^0$, $3^1$, $3^2$, . . .

The curve 64 in Fig. 4 shows an oscillation course having an amplitude of seven units on the measuring code scale, when the subtraction device starts functioning at the marking period $t^0$. The relay and contact arrangement cooperating with the code scale connects the subtraction generator belonging to the level group for the figure "1" to the storage for the potential signal energy, and the energy beyond this, which is being consumed in the damping arrangement, is eliminated from the storage. A subtraction occurs with a descent 65 down to level 6. This level number is divided equally with the basic 3, and therefore the level in question is not associated with a subtraction generator. The subtraction device is disconnected automatically, and from the one level which is evenly divisible with the base the discharge course 64 is continued to level 2 at $t_1$. The subtraction device becomes again operative. The contact arm at the code scale is connected with the level group corresponding to the figure "2," and the other subtraction generator to the signal energy storage. This lowers the discharge course quickly to level 1, where another subtraction immediately occurs down to zero level. The final result of the two subtraction is a descent 66 along two units to zero level.

The resulting code-pulse series is therefore:

$$t_0=1,\ t_1=2,\ t_2=0,\ t_3=0,\ \ldots$$

which may be written:

$$1.3^0+2.3^1+0.3^2+0.3^3+\ldots$$

Curve 67 in Fig. 4 gives an example of an amplitude which lies at $t_0$ outside the code signal. In the actual case the amplitude is 26 units at $t_0$. The subtraction device is not connected at this point; the first subtraction occurs at $t_1$ when the amplitude comes within the effective range of the code scale. It now corresponds with $8\tfrac{2}{3}$ units and with a subtraction drop 68 goes down to level 6, and the fraction of the unit measure is evened up by the subtraction mechanism. This is called the "quantizing" of the signal.

From level 6 the coding course continues as previously described, with one subtraction 66 on two units at $t_2$. In the code the subtractions are given only as whole "quantities," and the obtained pulse series in this case is:

$$t_0=0,\ t_1=2,\ t_2=2,\ t_3=0,\ \ldots,\ \text{or}$$
$$0.3^0+2.3^1+2.3^2+0.3^3+\ldots$$

This code gives a signal amplitude corresponding to 24 units and is thus encumbered with a fault which occurred in the "quantizing." As will be appreciated, all the signals having an amplitude at $t_0$ which lies within a range corresponding to 24 to 26 units will obtain the same code. In other words, the signal is to be measured with the unit quantity three times as large. That the condition must be such can be gathered from the fact that the lowest digit, the unit figure, is eliminated from the code-pulse series. For signal amplitudes so large that the first two figures disappear, the accuracy of measuring becomes a quantity corresponding to nine units of the scale, etc.

In Fig. 4a the curve 101 shows a time diagram of a ternary pulse-code received from a signal amplitude 7. The figure-marking is done with pulse amplitude, a lower amplitude for figure "1" and a larger for figure "2." Other possibilities through which the figures may be separated include the use of pulses of varied polarity, duration, phase placing, etc. The curve 101 thus shows one pulse for figure "1" at $t_0$ and one pulse corresponding to figure "2" at $t_1$. In Fig. 4b is shown on the same time scale the pulse-code received from the signal amplitude 26. At $t_1$ there is a pulse for figure "2," and likewise at $t_2$.

A code scale consisting of nine units gives, in the ternary system, two significant figures. A comparison between Figs. 4a and 4b indicates that this is valid, regardless of signal amplitude, and that the coding is done with the same relative care. Curve 101 reproduces the signal amplitude with care, so far as quantity is concerned, and curve 102 shows that in this case the amplitude is measured with the unit three times larger when, as mentioned, the figure at $t_0$ is eliminated. The pulse-codes are advanced in time so that, with larger amplitudes, the pulse-code arrives later and the code figures appear in higher digits. Within the "quantizing" range of the scale takes place a pure pulse-code modulation, but when the signal goes outside the scale the code time is moved. This time advancement is more in evidence the less the scale covers the part of the total likely signal amplitude range. It is therefore apparent that this manner of modulation constitutes a compromise between pulse-code and pulse-time modulation. In the latter case the modulation advances one single impulse in time.

The code which is obtained with the aid of a basic scale is thus a summary which indicates how many scale units in volume size the corresponding signal really contains, if it comes within the scale range. If outside the physically represented range, a summary is obtained which indicates in multipled scale units the value of the signal.

If the base in the summary system of the code device is designated as $p$ and the figures in the code as $a_1, a_2, a_3 \ldots$, or in general $a_n$, the code summary from the base scale will be:

$$a_n p^0 + a_n p^1 + a_n p^2 + a_n p^3 + \ldots + a_n p^m + a_n p^{m+1} + \ldots$$

The number of digits is unlimited but, depending on how many units the base scale of the code scale consists of, a limit is set for the number of significant figures. The figures can be increased with auxiliary scales and a sign or mark indicating the polarity of the signal may be applied to the code. If the base scale is not used, that is, if one uses one or more code scales which do not come near the zero level, a code is obtained which only indicates the fineness of the structure of the signal or of the measuring extent or value. This can occur if the largest significant figures in the code do not contain any information concerning the value, and it is then unnecessary to provide the code with "plus" and "minus" signs in the coding of a unipolar signal.

Code devices according to the principles indicated herein may be made in many forms, all of which it is impossible to discuss. Only one aspect of the development, namely, the electronic aspect, will be described with reference to some examples. The electronic coding devices are interesting primarily because of the greater coding speed obtainable therewith.

The examples have been selected on account of the different possibilities that exist to comprehend electronically the measuring scale and the contact medium. One can use a scale built of fixed electrodes scanned by a movable electron beam which constitutes the contact arm. The opposite condition is, however, also possible. In that case fixed contact electrodes may be used, and the scale which now is movable consists of inhomogeneities of an electron beam. A third possibility is to divide the contact arm into a number of partial arrangements and furnishing, in an extreme case, every level from which subtraction is to be made with its own contact medium. Under such conditions scale and contact arrangements are combined into one chain or relay series. It is also possible to conceive of cases where the scale or the contact arrangement is not materialized in a real sense, but oscillations or waves are in some form used in order to identify the level groups. The scale may, for instance, consist of a series of frequency filters scanned by a sliding frequency, and certain frequencies may be projected to detector means. As a scale one can even use a standing wave produced by a frequency-modulated oscillator in a suitable transmission conduit. One or several such conduit means applied to detectors will give a reading of oscillation curves and nodes.

Generally speaking, an arrangement with one or more crest- or top-shaped characters can be used as a code scale. When the corresponding arrangement is impressed by a variable entry value, voltage, current, frequency or the like, it produces an initial value which, when the entry value fluctuates, runs through one or more maxima and minima. Regarded as a function of an independent variable, the entry magnitude, the characteristic of the scale arrangement has at least an extreme value, often a series of such values.

Fig. 5 shows an example of a coding device employing a code tube with a stationary scale. The electrode system of the tube is enclosed in an evacuated envelope 72. From an electron-emitting cathode 69 is sent through a grid 58 and a slotted anode 70 a ribbon-shaped electron beam 56 through the focusing electrode 71 and vertical deflecting plates 55 and 97 to a code grid 57 and the subtraction plate 61. The beam 56 is deflected relative to the grid 57 by applying control voltages to the plates 55 and 97.

For binary coding there are required only two levels of two classes, odd and even, and the scale may in such a case be built in the form of a simple grid where the electron beam either will be intercepted on a grid wire, or else moves between two of the grid wires to a code or subtraction electrode disposed in back thereof. This intercepting electrode rests in front of a code grid, as seen from the cathode, and intercepts secondary electrons which are emitted from the grid wires when these are hit by the electron beam. For coding in other than the binary system, several grids are used which are successively struck by the electron beam as it sweeps over the scale.

At certain periods a charge is impressed from the two generators 51 and 60 through the rectifier 84 to the capacitors 73 and 75 connected with a code-impedance network. This consists of an RC-circuit composed of the capacitor 73 and the resistor 74 coupled serially with a damped parallel resonance circuit which comprises the capacitor 75, resistor 76 and induction coil 77.

With the aid of, a constant bias voltage and pulsing or alternating voltage from the generator 59 a voltage is put on the grid 58 so that the electron emission from the cathode is suppressed, except during the marking periods when the electrons momentarily escape. The dot-dash line marked SC indicates that the marking generator 59 is synchronized with the signal generator 60. Depending upon the deflecting voltage between the plates 55 and 97, the electron beam hits at the marking periods either a grid wire or else moves through the grid to the subtraction plate 61. In the latter case the electrons begin to discharge the condensers 73 and 75. The voltage over the code-impedance network is now reduced and also the potential of the connected deflection plate 55, so that the electron beam is deflected in a direction away from the plate and hits the nearest grid wire, and the current to the subtraction plate ceases to flow. The subtraction plate 61, the deflection plate 55 and the electron beam 56 together constitute a closed link which at every marking moment adjusts the voltage over the code-impedance network to a level determined by the electrodes, which is evenly divisible with the base.

The code-impedance network, like the one shown in Fig. 5, comprising one RC-circuit coupled in series with an RLC-circuit, can be made to produce a transient which is advantageous for greater code speeds. The total voltage for both circuits is an exponential process superimposed by a damped harmonic oscillation:

$$V(t) = \frac{C_2}{C_1-C_2} v_o e^{-t/R_1 C_1} + \frac{C_1}{C_1-C_2} v_o e^{-t/2R_2 C_2} \cos \omega t$$

where $V(t)$ is the voltage as a function of time, $v_o$ voltage across the impedance at a time $t=0$, and $e$ the base in the natural logarithm system. $R_1$ and $C_1$ are respectively resistance and capacitance in the RC-circuit. The resonance frequency of the oscillating circuit is:

$$\omega = \sqrt{1/L_2 C_2 - \tfrac{1}{4} R_2^2 C_2^2}$$

where $\omega$ is the angle frequency and $L_2$ the circuit inductance.

Figure 6:
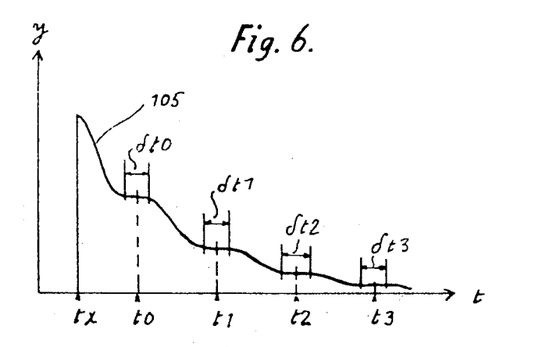
Fig. 6 is a time diagram of an oscillating transient composed of an exponential movement superimposed by a modified oscillation.

In Fig. 6 the curve 105 is a graphic illustration of this process when the time constant of the RC-circuit is equal to that of the oscillation circuit, that is:

$$R_1 C_1 = 2 R_2 C_2$$

and the frequency of the oscillation circuit is equal to the repeat frequency of the marking periods, or vice versa, the oscillation time:

$$2\pi/\omega = \Delta t = R_1 C_1 \log_e p$$

where $\Delta t$ is the time period between the markings and $p$ the base in the summary system of the codes.

The relation between the amplitudes of the two wave forms is constant and by selecting it properly, that is, by selecting it suitably between the capacitances $C_1$ and $C_2$, one can obtain horizontal plateaulike portions which on the curve 105 are marked $dt_0$, $dt_1$, and so on. They lie approximately 90° out of phase in the relation to maxima of the original cosinus oscillation of the RLC-circuit, and we arrive at the first plateau after c:a 270° or, in terms of time, ¾ $\Delta t$ from the charging point $t_x$. By placing the marking periods relative to these plateaus, the time factor becomes nondiscriminating and a portion of time can be reserved for the subtractions, thus resulting in an increase of the speed of coding without changing the time required for the subtractions.

The first concept of how the relationship $C_1/C_2$ should be selected, in order to arrive at the above noted plateau effect, is obtained if the derivate of the time function is permitted to remain during the marking periods at zero, proceeding from the fact that the marking period $t_0$ lies at the time distance ¾ $\Delta t$ from the charging point $t_x$. One then obtains:

$$C_1/C_2 = \frac{\log_e p}{2\pi}$$

A closer examination shows that it is possible to obtain, in the vicinity of these arbitrarily denoted marking periods, points where the first and the second derivates of the functions are equal to zero. In practice it may, however, be justified to deviate from the values in the relationship $C_1/C_2$ as such theoretical speculations may lead to. One cause for this is, among others, the subtractions.

While subtracting, certain deviations from the ideal wave form are often noted, due to the fact that the subtraction device does not remove energy in the same proportions from the RLC-circuit as from the RC-circuit. This is observed through a shifting in the original phase position for the damped oscillation after each subtraction at a time when the oscillating amplitude does not diminish in the same relation as the exponential wave at these subtractions. This phase and amplitude distortion does not play any greater role during the course of the coding, because the momentary voltage over the code-impedance at a marking period always is $1/p$:th part of the value at the preceding marking moment. After the last subtraction a remnant may remain in the capacitors, which may possibly cause disturbances, for example, crosstalk, when the invention is used in a multiplex telephone system. Usually this charge is small and of little consequence, and its effect can be further reduced by dimensioning the RLC-circuit in a suitable manner, for instance, by modifying the values of the resonance frequency according to the above calculations. If it becomes necessary, the residual charge can be destroyed with a special voltage or current pulse, or else the charging of the capacitors may cover such an interval of time that the residual charge will be obliterated. Without taking any particular precautions, the residual charge will disappear by itself in shattered amounts, provided enough time is permitted to elapse between two successive codings.

Another example of an electronic coding arrangement with movable scanning arm is shown in Fig. 7. To suppress the electron beam in a code tube may produce certain difficulties. A grid with good cutoff powers reduces the focusing ability of the electron beam and often even its current density, while a grid built with the idea of having good electronic optics generally breaks the electronic current only at high negative voltages against the cathode. A cathode tube with powerful and corrective focus beam is obtained by placing next to the cathode an electronic ray-forming screen as an electrode 88 in Fig. 7. This has a good electronic optical effect, but practically no resolving power. The connection of the subtraction plate at marking moments can be taken care of by a suitable relay. This is being done, as in Fig. 7, by a pentode 58 to which is fed the proper voltage.

The subtraction plate 61, from which a secondary emission can be suppressed with a suppression grid 89, is loaded with an impedance 78, and the voltage drop over this impedance, as a result of the current in the electron beam 56, is strengthened in an amplifier 79 coupled to the control grid G158 in the relay tube 58. In the cathode circuit of this tube is disposed the generator 59 which determines the coupling moment. Subtraction occurs when a sufficiently high positive voltage on the grid of the relay tube from the amplifier 79 coincides with a negative voltage from the generator 59 on the cathode tube 58. The otherwise cut off pentode leads in this way, and current to the anode A58 removes the load from the capacitors 73 and 75. From a pentode 80, which is coupled in parallel with the tube 58, the anode A80 of which is loaded with an impedance 83, can be obtained the code-pulse series over the terminal 85.

When the suppression grid 89 is at low potential, a secondary emission from the target subtraction electrode is prevented, and the pulses received from it are in such a case negative. If, however, the suppression grid or another suitable electrode is placed in the vicinity of the subtraction plate at a higher potential, the initial voltage may have reversed polarity on account of the secondary emission. Considerable amplification of the subtraction current may be had through multiplication of the secondary emission in several steps.

Fig. 7 also includes an example of bipolar coding. The signal generator 51 and the sample-taking generator 60 feed signal energy over a two-way amplifier 84 to the code-impedance net 73, 74, 75, 76, 77. Depending on the polarity, the signal takes alternate paths in the rectifying system, either over the impedance 81 or over impedance 82. On account of the voltage drop in the impedance, through which the charging current of the code capacitor travels, pulses denoting "plus" or "minus" may be obtained selectively from one of the terminals 86 or 87 over the impedances 90 and 91. The code thus obtained can, if so desired, be converted to a unipolar code, for example, with regard to a decoding arrangement.

Fig. 8 illustrates an example which, in certain details, differs from the embodiments described above. From an electron gun formed by cathode 69, grid 58, acceleration electrode 70 and a focusing arrangement 71, a ribbon-shaped electron beam 56 is directed against the measuring scale which is fitted for coding in the ternary summary system. It comprises two code grids 571 and 572 and an interceptor electrode 610. The electron beam is deflected magnetically by the coil 55.

From a zero level at the lower edge of the interceptor plate 610 the electron current moves first when the beam sweeps upward to level 1, which is the lowest bar on the code grid 571, from there to level 2 corresponding to the first bar on grid 572, and then on through both grids to the plate 610, when the position of the beam corresponds to the first level which is evenly divisible by 3. When the beam is deflected further upward, it points to level 4 which is, counted upward, the second bar of the grid 571. The operation continues in this manner to the end of the code scale. The current through the coil 5 is divided into levels of three classes, one being stable when the electron beam hits the target plate 610, and two unstable where the subtraction mechanism starts functioning during the marking periods.

These subtractions are in this case performed by secondary electrons gathered from the grids 571, 572 by a collector 61. The secondary electrons are symbolized in Fig. 8 by the lines 561. The electron beam 56 is at the marking periods intermittently released by the grid 58 and generator 59. If it then hits any one of the bars on girds 571 or 572, the secondary electrons from these grids to the subtraction electrode 61 will remove a charge from the capacitors 73 and 75 when, as previously described, the deflection of the electron beam is subtracted down to a stable level which is evenly divisible with the base. The back coupling link contains, besides the electron beam 56, the secondary electrons 561 and the collector 61, also the deflection amplifier 114, which may be provided in order to produce proper deflection current through the coil 55 corresponding to the voltage over the impedance network.

In a similar manner as previously described, signal energy is obtained for coding from the generator 51 aided by relay 50 and the signal generator 60 which is synchronized with the marking generator 59. The pulse-code figures are obtained as pulses over the impedances 631, 632.

In the code tubes so far mentioned a practically homogeneous electron beam sweeps over grids or similar electrode structures which form the measuring scale. The scale may, however, also be represented physically by inhomogeneities in the beam. Fig. 9 is an example. The figure shows a section of a tube intended for a trochoidal electron beam and indicates coupling details. The electron beam 57 forms the scale, and an end plate 56 the contact means.

Electrons emitted from a cathode 69 are accelerated by an anode 70. A magnetic field 94 perpendicular to the plane of the drawing, which is formed, for example, by current in the loop 99, deflects the electron beam past the anode into a chamber between an upper plate 55 with a potential which is positive to the cathode and the lower plate 97 which has the same or a lower voltage than the cathode. In this chamber is, under proper conditions, formed a trochoidal electron beam; that is, the electrons move in a perpendicular direction against both the magnetic field 94 and the electric field formed between the plates 55 and 97 in paths which consist of one circular component depending on the magnetic field and a linear component superimposed thereon. It is possible, as illustrated in Fig. 9, to produce a beam with a series of deflected centers 95 and arches 96. The number of centers and arches are determined by comparison between the running time in the tube and the revolutions of the circular movement.

The time for the circular movement is figured as follows:

$$T_c = m/e \frac{2\pi}{B}$$

where $m/e$ is the mass of electrons through their charging, and B the magnetic induction ends of the electrical field.

The transition time for the distance $s$ between the anode 70 and the end plate 56 is $$T_{tt} = \frac{s}{E/B} = 1/V \cdot \frac{sB}{k_1}$$

where $k_1$ is the proportionate constant between the electrical field strength E in the intervening chamber and the voltage V on the plate 55 as against the plate 97.

The comparison $$T_{t1}/T_c = k_2 \frac{B^2}{V}$$

where $k_2$ as a constant indicates the number of centers and arches on the electron beam 57.

When the voltage V on the plate 55 varies, the number of centers and arches are changed according to the above equation, and the plate 56 is hit alternately by either an arch or a centerpoint. The end or aperture plate 56 is near its edge provided with a hole or slot 98. An arch of the trochoidal beam hits the aperture plate in the vicinity of the slot, and electrons can then pass through the slot to the subtraction or target plate 61. One point of the trochoidal beam strikes another part of the end plate, and the subtraction electrode becomes dead. A series of current peaks to the subtraction electrode are thus obtained when the voltage on plate 55 is varied, and the peaks divide the voltage into levels of varied classes. One beam with an aperture plate gives two level classes and thus becomes a scale and contact means for binary coding. Other summary systems may be obtained by suitable combination arrangements.

For binary coding one can selectively determine that, for instance, all voltages on the plate 55 corresponding to current to the subtraction plate are at odd levels. The total number of levels in the binary code scale will then be $$N = 2k_2 B^2 (1/V_{min} - 1/V_{max})$$

where $V_{min}$ is, with respect to the plate 97, the lowest and $V_{max}$ the corresponding highest allowed voltage value on the plate 55.

Fig. 9 also shows at 51 a signal source, at 60 the coupling generator, at 50 the coupling relay and also the four-pole terminal device 54. Only when the aperture plate has the proper voltage can the electrons pass through the slot 98; otherwise the beam is deflected past this slot. For this reason the electrons can at a marking time pass through for subtraction. For instance, the voltage on the aperture plate is permitted to vary with the generator 59.

In Fig. 10 is shown another example of an electronic code tube with inhomogeneous beam. Electrons are attracted by the anode 70 from a cathode 69. The cathode is surrounded by a cylinder 58 which cuts off the electron emission when the generator 59 places it under sufficient negative bias. After the anode follows an electron space screened by the cylinder 93 and ending with an aperture plate 56 in which is provided a hole 98. Behind the aperture plate is the target or subtraction plate 61. A current flowing through a solenoid having windings 55 disposed around the envelope of the tube, produces a magnetic field 94 which extends axially of the tube in parallel therewith.

The electron beam 57 leaves in a divergent cluster through a hole in the anode but, because of the magnetic field, the radial components of the electron paths are deflected circularly and the electrons begin to describe spirals. The running time for all circular components is $$T_c = m/e \frac{2\pi}{B} = m/e \frac{2\pi}{k_3 I}$$

where $k_3$ is the proportionality factor between the magnetic induction B in the chamber and the amperage I through the coil 55.

After each turn the electrons return to the central axis, resulting in a series of focal points 95 between arch-shaped portions or bulges 96 on the electron beam 57. The elapsed time through the tube is $$T_{t2} \frac{s}{\sqrt{2e/m \cdot V}}$$

where $s$ is the distance between anode and aperture plate, and V the potential or cylinder 93. The number of bulges and focal points in the chamber is described as:

$$T_{t2} T_c = k_4 \frac{B}{\sqrt{V}} = k_3 k_4 \frac{I}{\sqrt{V}}$$

where $k_4$ is a constant.

When a focus of the electron beam hits the aperture plate, a relatively large current passes through the hole 98 to the subtraction plate 61. The density in the bulges is less and the current to the subtraction electrode is relatively weak when it strikes the aperture plate. If the voltage in the cylinder 93 is kept constant, a series of current peaks can be directed to the electrode 61 by varying the current through coil 55. This current is divided by the current to the subtraction plate in levels of two classes, and the total number of levels is $$N = \frac{2k_3 k_4}{\sqrt{V}} (I_{max} - I_{min})$$

where $I_{max}$ and $I_{min}$ are the extreme values of the current through the coil 55.

The coil 55 of Fig. 10 may also be used as a coding element. When the relay 50 is actuated by the generator 60, a current from the signal source 51 is momentarily impressed through the winding 55 and a signal energy is stored in the magnetic field 94. The energy which has been extracted from the signal current is being used, after restoration of the relay 50, in the resistor 110. Parallel to the RL-circuit formed by the coil 55 and resistor 110 lies, in addition to the subtraction impedance 63, a damped series resonance circuit comprising the resistor 111, induction coil 112 and capacitor 113. This RLC-circuit has the same purpose as explained before in connection with damped oscillations superimposing the exponential course.

The subtraction are performed through the voltage drop in the impedance 63 when the electrons pass to the subtraction plate. It may often be the proper thing to conduct the electronic pulses separately to the plate 61, to amplify them, and to feed subtraction current to the code circuit on a low impedance level. Great coding speeds may be obtained in this manner.

In Fig. 11 is shown how the scale and contact arrangement may be combined to form a chain relay series. Such a series may be visualized as a kind of ladder composed of code tubes, each of which has only two levels. Such a ladder may be built with conventional types of electron tubes, and it is proposed in Fig. 11 to use in particular manner a chain of diodes and triodes. There are also other possibilities to realize the relay series, for instance, with pentodes, and of course special tubes may be built for the purpose, if desired.

The first seven or eight levels in the binary ladder are shown in Fig. 11, and in connection therewith suitable arrangements are indicated for automatic coding. Modification of the couplings of Fig. 11 may be undertaken according to given practical and technical requirements.

The double triodes in the chain series are indicated at 201, 202, 203 and 204, and the associated diode rectifiers, which may be, for example, crystal type rectifiers, are marked $X_{11}$, $X_{12}$, $X_{21}$, $X_{22}$, etc. The cathodes $K_{11}$, $K_{12}$, $K_{21}$, $K_{22}$, etc. are disposed in pairs and connected to the proper voltage over impedances $ZK_1$, $ZK_2$, etc. The anodes of the triodes are disposed in two groups, as indicated at $A_{11}$, $A_{12}$, $A_{22}$ . . . . The first group is connected over the impedance 78. One group $G_{11}$, $G_{21}$, etc. of the triode grids receives grid voltage over the impedances $ZG_{11}$, $ZG_{21}$ . . ., while the other group of grids $G_{12}$, $G_{22}$, . . . is connected to voltage sources over the rectifiers $X_{12}$, $X_{22}$. . . . This latter group is over the impedances $ZG_{12}$, $ZG_{22}$ ... connected to a common terminal 252, to which is also connected the first-named group of triode grids over the rectifiers $X_{11}$, $X_{21}$. ... The diodes or crystal rectifiers are connected so that the current passes from the respective grid voltage sources through the associated grid impedances when the voltage on the terminal 252 falls below the corresponding grid bias. On the terminal 252 is placed the voltage over a divided impedance net, and in order to obtain a low impedance level the feeding is performed in Fig. 11 with a cathode tube 250. The low impedance level may be important at high coding speeds.

The current flows to one of the anodes of group $A_{11}$, $A_{21}$ ... where the associated constant grid voltages are in the vicinity of the voltage on the terminal 252. It may be assumed, for instance, that the grids $G_{11}$ and $G_{12}$ in the double triode 201 are fed with approximately the same constant voltage from the respective current sources. If the voltage on the terminal 252 is lowered and the valves $X_{11}$ and $X_{12}$ are open, the current flows through the impedances $ZG_{11}$ and $ZG_{12}$. On account of the voltage drop in $ZG_{11}$, the bias on the grid $G_{11}$ drops to the voltage on the terminal 252, while the bias for grid $G_{12}$ remains in the vicinity of the terminal voltage, because the voltage drop over the diode $X_{12}$ is small in the direction of the current flow.

The triode in tube 201, which comprises the cathode $K_{12}$, grid $G_{12}$ and anode $A_{12}$, is connected as a cathode follower, and the potential for cathode $K_{12}$ tries to follow the grid $G_{12}$. On account of the common cathode impedance $ZK_1$, the cathode $K_{11}$ is held to the same potential as $K_{12}$, and therefore the current to anode $A_{11}$ is cut off when the voltage on the terminal 252, and thus also on the grid $G_{11}$, is lowered.

If, on the other hand, the voltage on the terminal 252 is increased, the valves $X_{11}$ and $X_{12}$ will close. The grid $G_{11}$ is disconnected from its source and, as a result of the connection over the impedance $ZG_{12}$, follows the increase of the terminal voltage. The voltage on the cathodes $K_{11}$ and $K_{12}$ increases likewise, and the current to $A_{11}$ is again cut off.

It is thus only at a certain interval of the voltage on the terminal 252 that current flows to the anode $A_{11}$. By putting the proper bias voltages on another double triode, current can be obtained for the corresponding anode in another voltage interval on the terminal 252, and by arranging several similar intervals near one another a total characteristic can be produced for different groups of anodes consisting of series of current peaks, and the voltage on the common grid conductor varies. As previously noted, the variable voltage is on these peaks divided in levels of different classes.

As shown in Fig. 11, the voltage drops produced in the impedance 78 by the anode currents are augmented in an amplifier 79, the output of which is coupled to a coincidence unit 58 through which is closed in the marking periods the back coupling circuit for the subtraction, such closure being effected with the aid of the generator 59. Sample taking of the signal from the source 51 is performed with the generator 60 and the relay 50 in the same manner as described in connection with the previous examples. Apparatus as noted above can be made for very speedy operation, but it is quite complicated and contains a large number of electron tubes. A very much simplified embodiment is shown in Fig. 12.

In Fig. 12 the exponentially dropping code voltage from the four-pole terminal network 54 is converted into a variable frequency with the aid of the frequency modulator 700 which comprises an oscillator 706, the oscillating circuit of which is shunted by a reactance tube 705. The variable frequency received from the frequency modulator is moved to a proper frequency band with an oscillator 704 and a mixer 701 which may comprise a mixing crystal X701.

After the mixer follows a band filter 702 which converts the desired frequency band to the scale 57. The latter consists of a series of frequency filters indicated by the capacitors and inductances C571—L571, C572—L572, etc. The scale is followed by a detector 703 comprising a rectifier X703 and an impedance Z703.

The filters in the scale 57 are arranged so as to pass a series of closely placed frequencies, at which time corresponding voltages and currents are formed in the detector. Similar output maxima can divide the voltage in the frequency modulator 700 into a series of levels in different classes in the manner as previously described.

At the marking periods the relay 58 is closed under the control of the generator 59, and the back coupling of subtraction starts functioning. The coding is thereafter performed in the same manner as previously described.

Fig. 12 is intended to illustrate only the principle and may be modified and complemented in many ways. For instance, the coupling may be changed to coding in another summary system, and the integral components may be changed and rearranged.

What has been said above in connection with Fig. 12 is true for the entire disclosure. The invention is not confined to the described procedures and examples. It may, for instance, be emphasized that the course the code divisions take must not necessarily be of an exponential character, but may be a selected function of the time, if only the amplitude is reduced to a fraction $1/p$ of its value between the marking periods. The transient course is linear, and the marking moments will be exponentially distributed in time. It is likewise not absolutely necessary to establish at the marking periods a closed back coupling link for the subtractions. They may be produced by withdrawing in advance the proper energy loads from the stored signal energy. It may be repeated, in conclusion, that the disclosure illustrates only one phase of the development covered by the invention.

Changes may be made within the scope and spirit of the appended claims.

I claim:

1. A pulse code modulator comprising a storage device, a pulse generator, means for continuously charging said storage device from said pulse generator, a measuring device, means for connecting said measuring device in predetermined intervals to said storage device to determine the numerical values of the charges thereof, a control device co-operating with said measuring device for causing transmission of a code signal when the determined numerical value is not divisible by a desired fundamental number, and means in said control device for coincidentally causing accelerated momentary discharge of said storage device to the next successive numerical value which is divisible by the fundamental number.

2. Arrangement according to claim 1, wherein said storage device comprises a capacitance and impedance connected in parallel.

3. Arrangement according to claim 1, wherein said storage device comprises an inductance and a resistance element in parallel therewith.

4. Arrangement according to claim 1, wherein said storage device comprises an RC-circuit serially coupled with an RLC-circuit.

5. Arrangement according to claim 1, wherein said storage device comprises an RC-circuit coupled in parallel with an RLC-circuit.

6. Arrangement according to claim 1, comprising a plurality of electron tubes, and coupling means for causing electronic current to flow to anodes in different tubes in varied amplitude intervals of the charges impressed upon said storage device from said pulse generator.

7. Arrangement according to claim 1, comprising frequency-modulation means and frequency filter means, wherein a variable frequency is released in limited frequency intervals through said frequency filter means a detector for receiving said frequency from said filter means, said variable frequency corresponding to the charges impressed upon said storage device from said pulse generator.

8. Arrangement according to claim 1, comprising frequency-modulation means, wherein a variable frequency corresponding to the charges impressed upon said storage device from said pulse generator produces a stationary wave, and a detector for receiving said wave.

References Cited in the file of this patent

UNITED STATES PATENTS

| | | |
|---|---|---|
| 2,458,652 | Sears | Jan. 11, 1949 |
| 2,463,535 | Hecht | Mar. 8, 1949 |
| 2,473,691 | Mecham | June 21, 1949 |
| 2,514,671 | Rack | July 11, 1950 |
| 2,530,538 | Rack | Nov. 21, 1950 |
| 2,570,220 | Earp et al. | Oct. 9, 1951 |
| 2,602,158 | Carbrey | July 1, 1952 |
| 2,605,361 | Cutler | July 29, 1952 |
| 2,662,113 | Schouten et al. | Dec. 8, 1953 |